United States Patent
Liang

(10) Patent No.: US 11,347,635 B2
(45) Date of Patent: May 31, 2022

(54) MEMORY CONTROL METHOD, MEMORY STORAGE DEVICE AND MEMORY CONTROL CIRCUIT UNIT

(71) Applicant: PHISON ELECTRONICS CORP., Miaoli (TW)

(72) Inventor: Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 72 days.

(21) Appl. No.: 16/280,040

(22) Filed: Feb. 20, 2019

(65) Prior Publication Data
US 2020/0218647 A1 Jul. 9, 2020

(30) Foreign Application Priority Data

Jan. 4, 2019 (TW) .................................. 108100445

(51) Int. Cl.
*G06F 12/00* (2006.01)
*G06F 12/02* (2006.01)
*G06F 3/06* (2006.01)

(52) U.S. Cl.
CPC ........ *G06F 12/0246* (2013.01); *G06F 3/0659* (2013.01); *G06F 3/0679* (2013.01);
(Continued)

(58) Field of Classification Search
CPC ............... G06F 3/0659; G06F 3/0679; G06F 2212/7201; G06F 2212/7203; G06F 12/0246
See application file for complete search history.

(56) References Cited

U.S. PATENT DOCUMENTS

| 2003/0023811 A1* | 1/2003 | Kim ...................... G06F 3/0601 |
| | | 711/114 |
| 2008/0140945 A1* | 6/2008 | Salessi .................... G06F 3/061 |
| | | 711/148 |

(Continued)

FOREIGN PATENT DOCUMENTS

TW          I475385          3/2015

OTHER PUBLICATIONS

Webster's Dictionary; "Memory Access;" Apr. 21, 2013; Webster-Dictionary; available at: https://web.archive.org/web/20130421031511/https://www.webster-dictionary.org/definition/Memory%20access (Year: 2013).*

(Continued)

*Primary Examiner* — Prasith Thammavong
*Assistant Examiner* — Richard L Sutton
(74) *Attorney, Agent, or Firm* — JCIPRNET

(57) ABSTRACT

A memory control method for a rewritable non-volatile memory module which includes a plurality of physical groups is provided according to an exemplary embodiment of the disclosure. The memory control method includes: storing first table information into a first physical group among the physical groups, wherein the first table information records management information corresponding to a first logical range; storing second table information into a second physical group among the physical groups, wherein the second table information also records the management information corresponding to the first logical range; and instructing a reading of the second table information from the second physical group to obtain the management information corresponding to the first logical range in response to that the first physical group is in a default status.

27 Claims, 11 Drawing Sheets

(52) U.S. Cl.
CPC .............. *G06F 2212/7201* (2013.01); *G06F 2212/7203* (2013.01)

(56) References Cited

U.S. PATENT DOCUMENTS

| | | | | |
|---|---|---|---|---|
| 2011/0004723 A1* | 1/2011 | Kheng-Chong | .... | G06F 12/0246 711/103 |
| 2011/0029719 A1* | 2/2011 | Yeh | ...... | G06F 12/0246 711/103 |
| 2011/0179224 A1* | 7/2011 | Rossi | ...... | G06F 11/2087 711/114 |
| 2011/0231621 A1* | 9/2011 | Liang | ...... | G06F 11/1435 711/155 |
| 2013/0024604 A1* | 1/2013 | Yeh | ...... | G06F 12/0246 711/103 |
| 2013/0124794 A1* | 5/2013 | Bux | ...... | G06F 12/0246 711/103 |
| 2013/0246732 A1* | 9/2013 | Seng | ...... | G06F 12/0246 711/203 |
| 2016/0197722 A1* | 7/2016 | Mothilal | ...... | H04L 9/304 713/193 |
| 2016/0239239 A1* | 8/2016 | Tin | ...... | G06F 11/00 |
| 2016/0246509 A1* | 8/2016 | Bennett | ...... | G06F 3/0688 |
| 2017/0039141 A1* | 2/2017 | Yeh | ...... | G06F 3/0656 |
| 2017/0185296 A1* | 6/2017 | Dong | ...... | G06F 3/061 |
| 2017/0185316 A1* | 6/2017 | Nieuwejaar | ...... | G06F 3/065 |
| 2017/0315925 A1* | 11/2017 | Yeh | ...... | G06F 12/1009 |
| 2018/0004413 A1* | 1/2018 | Zhang | ...... | G06F 3/0655 |
| 2018/0113875 A1* | 4/2018 | Jain | ...... | G06F 3/0679 |
| 2018/0173619 A1* | 6/2018 | Sivasankaran | ...... | G06F 12/0246 |
| 2019/0251039 A1* | 8/2019 | Modi | ...... | G06F 3/0604 |

OTHER PUBLICATIONS

"Office Action of Taiwan Counterpart Application", dated Jul. 15, 2020, pp. 1-6.

* cited by examiner

MEMORY CONTROL METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 108100445, filed on Jan. 4, 2019. The entirety of the above-mentioned patent application is hereby incorporated by reference herein and made a part of this specification.

BACKGROUND

Technical Field

The disclosure relates to a memory control technology, and more particularly to a memory control method, a memory storage device, and a memory control circuit unit.

Description of Related Art

Digital cameras, mobile phones, and MP3 players have been growing very quickly in recent years, causing consumer demand for storage media to increase rapidly. Since a rewritable non-volatile memory module (e.g. a flash memory) has characteristics such as data non-volatile, power saving, small size, no mechanical structure, etc., the rewritable non-volatile memory module is very suitable to be built in the various portable multimedia devices exemplified above.

When some memory storage devices are in operation, management tables such as logical-physical mapping tables in the rewritable non-volatile memory module may be read into the buffer memory in batches. Then, the memory controller may access the rewritable non-volatile memory module according to the information of the management tables in the buffer memory.

However, when a specific management table is to be accessed, if all channels of a memory storage devices are busy, the memory controller needs to wait for at least one channel to complete his work. Then, the memory controller may read the required management table through the idle channel. This condition is also known as a load table latency. In some cases, load table latency may result in processing time differences between different commands, thereby reducing the operational stability of the memory storage device.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a memory control method, a memory storage device, and a memory control circuit unit, which are capable of improving an operation stability of a memory storage device.

A memory control method for a rewritable non-volatile memory module which includes a plurality of physical groups is provided according to an exemplary embodiment of the disclosure. The memory control method includes: storing first table information into a first physical group among the physical groups, wherein the first table information records management information corresponding to a first logical range; storing second table information into a second physical group among the physical groups, wherein the second table information also records the management information corresponding to the first logical range; and instructing a reading of the second table information from the second physical group to obtain the management information corresponding to the first logical range in response to that the first physical group is in a default status.

A memory storage device which includes a connection interface unit, a rewritable non-volatile memory module and a memory control circuit unit is provided according to an exemplary embodiment of the disclosure. The connection interface unit is configured to connect a host system. The rewritable non-volatile memory module includes a plurality of physical groups. The memory control circuit unit is coupled to the connection interface unit and the rewritable non-volatile memory module. The memory control circuit unit is configured to store first table information into a first physical group among the physical groups, wherein the first table information records management information corresponding to a first logical range. The memory control circuit unit is further configured to store second table information into a second physical group among the physical groups, wherein the second table information also records the management information corresponding to the first logical range. The memory control circuit unit is further configured to instruct a reading of the second table information from the second physical group to obtain the management information corresponding to the first logical range in response to that the first physical group is in a default status.

A memory control circuit unit for controlling a rewritable non-volatile memory module which includes a plurality of physical groups is provided according to an exemplary embodiment of the disclosure. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to store first table information into a first physical group among the physical groups, wherein the first table information records management information corresponding to a first logical range. The memory management circuit is further configured to store second table information into a second physical group among the physical groups, wherein the second table information also records the management information corresponding to the first logical range. The memory management circuit is further configured to instruct a reading of the second table information from the second physical group to obtain the management information corresponding to the first logical range in response to that the first physical group is in a default status.

Based on the above, at least two copies of table information corresponding to the first logical range are stored to a first physical groups and a second physical groups in the rewritable non-volatile memory module according to exemplary embodiments of the disclosure. Thereafter, in response to that a specific physical group (e.g., the first physical group) is in the default status, the table information may be read from another physical group (e.g., the second physical group) to obtain the required management information. Therefore, an occurring opportunity of the load table latency may be reduced and the operation stability of the memory storage device may be improved.

To make the aforementioned and other features of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and may be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
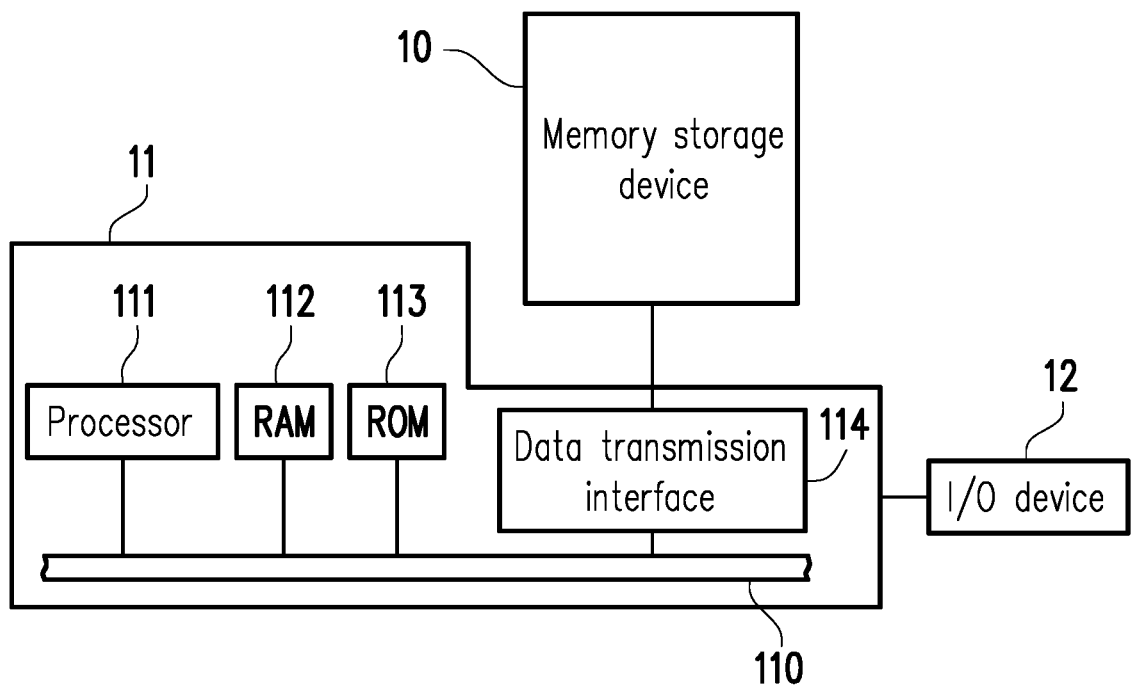
FIG. 1 is a schematic diagram of a host system, a memory storage device, and an input/output (I/O) device according to an exemplary embodiment of the disclosure.

Reference may now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" may be used interchangeably herein.

Generally, a memory storage device (also referred to as a memory storage system) includes a rewritable non-volatile memory module and a controller (also referred to as a control circuit). The memory storage device is normally used together with a host system, allowing the host system to write data to the memory storage device or read data from the memory storage device.

Figure 2:
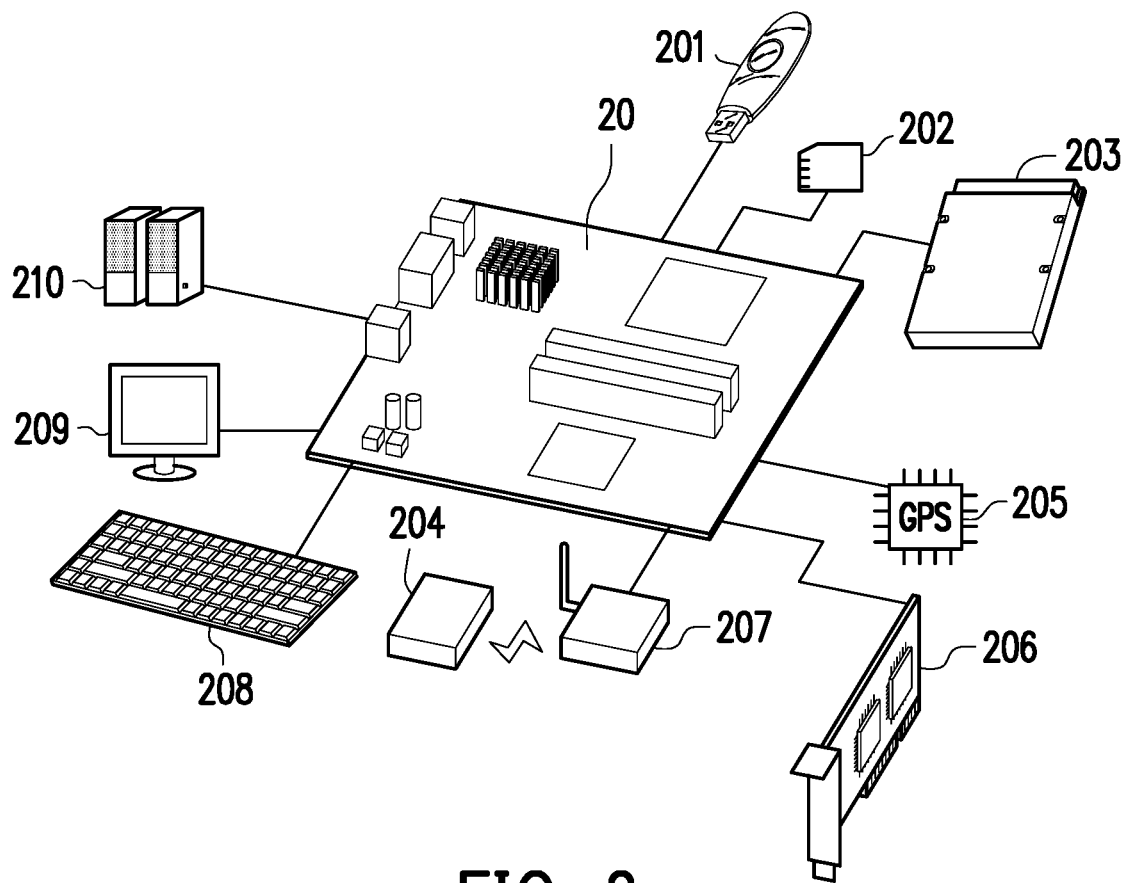
FIG. 2 is a schematic diagram of a host system, a memory storage device, and an I/O device according to another exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to another exemplary embodiment of the disclosure.

Please refer to FIG. 1 and FIG. 2, a host system 11 normally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the exemplary embodiment, the host system 11 is coupled to a memory storage device 10 through the data transmission interface 114. For example, the host system 11 may store data to the memory storage device 10 or read data from the memory storage device 10 via the data transmission interface 114. In addition, the host system 11 is coupled to an I/O device 12 through the system bus 110. For example, the host system 11 may transmit an output signal to the I/O device 12 or receive an input signal from the I/O device 12 via the system bus 110.

In the exemplary embodiment, the processor 111, the random access memory 112, the read-only memory 113, and the data transmission interface 114 may be disposed on a motherboard 20 of the host system 11. The number of data transmission interfaces 114 may be one or more. The motherboard 20 may be coupled to the memory storage device 10 via a wired or a wireless method through the data transmission interface 114. The memory storage device 10 may be, for example, a flash drive 201, a memory card 202, a Solid State Drive (SSD) 203, or a wireless memory storage device 204. The wireless memory storage device 204 may be, for example, a Near Field Communication (NFC) memory storage device, a wireless fidelity (WiFi) memory storage device, a Bluetooth memory storage device, a Bluetooth low energy (BLE) memory storage device (e.g. iBeacon), or other memory storage devices based on various types of wireless communication technologies. In addition, the motherboard 20 may also be coupled to a Global Positioning System (GPS) module 205, a network interface card 206, a wireless transmission device 207, a keyboard 208, a screen 209, a speaker 210, or other types of I/O devices through the system bus 110. For example, in an exemplary embodiment, the motherboard 20 may access the wireless memory storage device 204 through the wireless transmission device 207.

Figure 3:
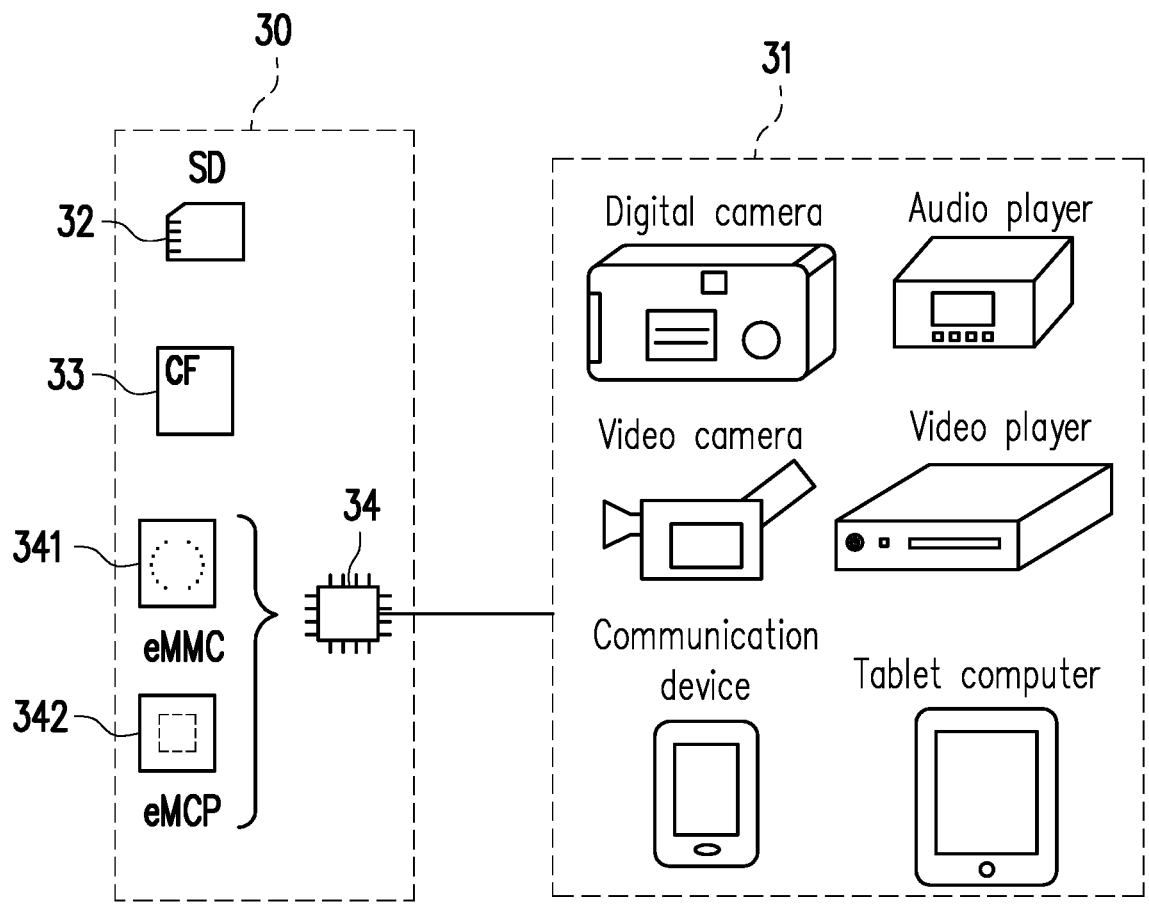
FIG. 3 is a schematic diagram of a host system and a memory storage device according to another exemplary embodiment of the disclosure.

In an exemplary embodiment, the host system mentioned may be any system that may substantially work with a memory storage device to store data. Although in the exemplary embodiments above, a computer system is used as the host system for illustration, FIG. 3 is a schematic diagram of a host system and a memory storage device according to another exemplary embodiment of the disclosure. Please refer to FIG. 3, in another exemplary embodiment, a host system 31 may also be a digital camera, a video camera, a communication device, an audio player, a video player, a tablet computer, or other systems. A memory storage device 30 may be a Secure Digital (SD) card 32, a Compact Flash (CF) card 33, an embedded storage device 34, or other types of non-volatile memory storage devices used by the host system 31. The embedded storage device 34 includes an embedded Multi Media Card (eMMC) 341, and/or an embedded Multi Chip Package (eMCP) storage device 342, or various types of embedded storage devices which directly couple a memory module onto a substrate of a host system.

Figure 4:
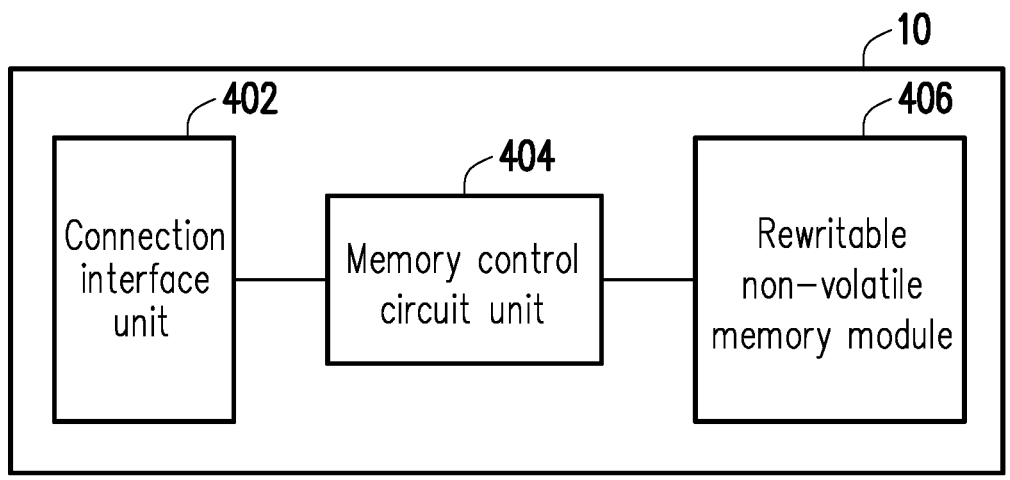
FIG. 4 is a functional block diagram of a memory storage device according to an exemplary embodiment of the disclosure.

FIG. 4 is a functional block diagram of a memory storage device according to an exemplary embodiment of the disclosure.

Please refer to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. The memory storage device 10 may communicate with the host system 11 through the connection interface unit 402. In the exemplary embodiment, the connection interface unit 402 is compatible with the Serial Advanced Technology Attachment (SATA) standard. However, it must be understood that the disclosure is not limited thereto. The connection interface unit 402 may also be compatible with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the SD interface standard, the Ultra High Speed-I (UHS-I) interface standard, the Ultra High Speed II (UHS-II) interface standard, the Memory Stick (MS) interface standard, the MCP interface standard, the MMC interface standard, the eMMC interface standard, the Universal Flash Storage (UFS) interface standard, the eMCP interface standard, the CF interface standard, the Integrated Device Electronics (IDE) standard, or other suitable standards. The connection interface unit 402 may be packaged in one chip with the memory control circuit unit 404 or the connection interface unit 402 may be disposed outside a chip containing the memory control circuit unit 404.

The memory control circuit unit 404 is configured to perform multiple logic gates or control commands implemented using a hardware type or a firmware type and execute operations such as writing, reading, and erasing of data in the rewritable non-volatile memory module 406 according to the command of the host system 11.

The rewritable non-volatile memory module 406 is coupled to the memory control circuit unit 404 and is configured to store data written by the host system 11. The rewritable non-volatile memory module 406 may be a Single Level Cell (SLC) NAND flash memory module (i.e., a flash memory module which stores 1-bit in one memory cell), a Multi Level Cell (MLC) NAND flash memory module (i.e., a flash memory module which stores 2-bits in one memory cell), a Triple Level Cell (TLC) NAND flash memory module (i.e., a flash memory module which stores 3-bits in one memory cell), a Quad Level Cell (QLC) NAND flash memory module (i.e., a flash memory module which stores 4-bits in one memory cell), other flash memory modules, or other memory modules with the same characteristic.

Each memory cell of the rewritable non-volatile memory modules 406 stores one or more bits based on a change of voltage (also referred to as a threshold voltage hereinafter). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell of the rewritable non-volatile memory module 406 has multiple storage states. Through applying a read voltage, the storage state to which a memory cell belongs may be determined, thereby obtaining one or more bits stored by the memory cell.

In the exemplary embodiment, the memory cells of the rewritable non-volatile memory module 406 constitute multiple physical programming units, and the physical programming units constitute multiple physical erasing units. Specifically, the memory cells on the same word line form one or more physical programming units. If each memory cell may store two bits or more than 2 bits, then the physical programming units on the same word line may at least be classified into a lower physical programming unit and an upper physical programming unit. For example, a Least Significant Bit (LSB) of a memory cell belongs to the lower physical programming unit while a Most Significant Bit (MSB) of a memory cell belongs to the upper physical programming unit. Generally, in an MLC NAND flash memory, the write speed of the lower physical programming unit is greater than the write speed of the upper physical programming unit, and/or the reliability of the lower physical programming unit is higher than the reliability of the upper physical programming unit.

In the exemplary embodiment, the physical programming unit is the smallest unit of programming. That is, the physical programming unit is the smallest unit of write data. For example, the physical programming unit is a physical page or a physical sector. If the physical programming unit is a physical page, then the physical programming units normally include a data bit region and a redundancy bit region. The data bit region includes multiple physical sectors for storing user data while the redundancy bit region is for storing system data (e.g. management data such as error correction codes, etc.). In the exemplary embodiment, the data bit region contains 32 physical sectors, and the size of one physical sector is 512 bytes (B). However, in other exemplary embodiments, a data bit region may also contain 8, 16, a higher number, or a lower number of physical sectors, and the size of each physical sector may also be larger or smaller. On the other hand, the physical erasing unit is the smallest unit of erase. That is, each physical erasing unit includes the smallest number of memory cells erased together. For example, the physical erasing unit is a physical block.

Figure 5:
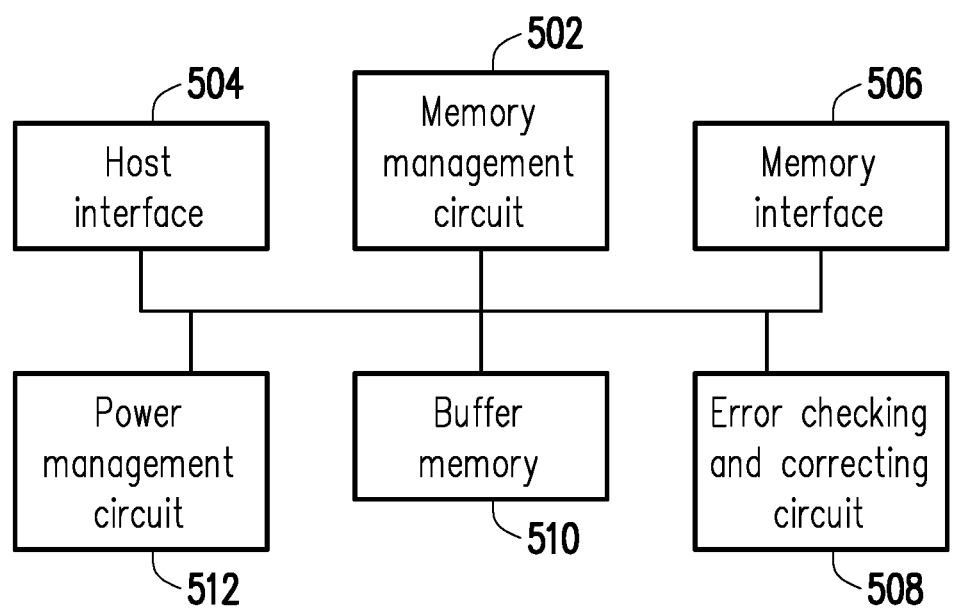
FIG. 5 is a functional block diagram of a memory control circuit unit according to an exemplary embodiment of the disclosure.

FIG. 5 is a functional block diagram of a memory control circuit unit according to an exemplary embodiment of the disclosure.

Please refer to FIG. 5, the memory control circuit unit 404 includes a memory management circuit 502, a host interface 504 and a memory interface 506.

The memory management circuit 502 is configured to control the overall operation of the memory control circuit unit 404. Specifically, the memory management circuit 502 has multiple control commands. When the memory storage device 10 operates, the control commands are performed to carry out operations such as writing, reading, and erasing of data. The illustration of operation of the memory management circuit 502 below may be equivalent to the illustration of operation of the memory control circuit unit 404.

In the exemplary embodiment, the control commands of the memory management circuit 502 are implemented using a firmware form. For example, the memory management circuit 502 has a microprocessor unit (not shown) and a read only memory (not shown), and the control commands are burnt into the read only memory. When the memory storage device 10 operates, the control commands are performed by the microprocessor unit to carry out operations such as writing, reading, and erasing of data.

In another exemplary embodiment, the control commands of the memory management circuit 502 may also be stored in a specific area of the rewritable non-volatile memory module 406 (e.g. a system area in the memory module dedicated to storage of system data) as a program code. In addition, the memory management circuit 502 has a microprocessor unit (not shown), a read only memory (not shown), and a random access memory (not shown). In particular, the read only memory has a boot code. When the memory control circuit unit 404 is enabled, the microprocessor unit first performs the boot code to load the control commands stored in the rewritable non-volatile memory module into the random access memory of the memory management circuit 502. Then, the microprocessor unit may run the control commands to carry out operations such as writing, reading, and erasing of data.

In addition, in another exemplary embodiment, the control commands of the memory management circuit 502 may also be implemented using a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage memory cells of the rewritable non-volatile memory module 406 or a group thereof. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process the data to be written to the rewritable non-volatile memory module 406 and the data read from the rewritable non-volatile memory module 406. The write command sequence, the read command sequence, and the erase command sequence may each include one or more program code or command code, and are for instructing the rewritable non-volatile memory module 406 to perform the corresponding write, read, erase, etc. operations. In an exemplary embodiment, the memory management circuit 502 may also issue other types of command sequences to the rewritable non-volatile memory module 406 to instruct performance of the corresponding operation.

The host interface 504 is coupled to the memory management circuit 502. The memory management circuit 502 may communicate with the host system 11 through the host interface 504. The host interface 504 is configured to receive and identify commands and data transmitted by the host system 11. For example, the commands and the data transmitted by the host system 11 are transmitted to the memory management circuit 502 through the host interface 504. Furthermore, the memory management circuit 502 may transmit data to the host system 11 through the host interface 504. In the exemplary embodiment, the host interface 504 is compatible with the SATA standard. However, it must be understood that the disclosure is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other standards suitable for data transmission.

The memory interface 506 is coupled to the memory management circuit 502 and is configured to access the rewritable non-volatile memory module 406. In other words, the data to be written to the rewritable non-volatile memory module 406 is converted to a format acceptable to the rewritable non-volatile memory module 406 via the memory interface 506. Specifically, if the memory management circuit 502 is to access the rewritable non-volatile memory module 406, the memory interface 506 may transmit a corresponding command sequence. For example, the command sequences may include a write command sequence instructing a writing of data, a read command sequence instructing a reading of data, an erase command sequence instructing an erasing of data, and corresponding command sequences for instructing various types of memory operations (e.g. changing read voltage level, performing garbage collection operation, etc.). The command sequences are generated, for example, by the memory management circuit 502 and transmitted to the rewritable non-volatile memory module 406 through the memory interface 506. The command sequences may include one or more signals, or data on the system bus. The signals or data may include command codes or program codes. For example, in the read command sequence, information such as a read identification code, a memory address, etc. are included.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and is configured to perform error checking and correcting operations to ensure correctness of data. Specifically, when the memory management circuit 502 receives a write command from the host system 11, the error checking and correcting circuit 508 may generate an error correcting code (ECC) and/or an error detecting code (EDC) for the data corresponding to the write command. The memory management circuit 502 may write the data corresponding to the write command and the corresponding error correcting code and/or error detecting code into the rewritable non-volatile memory module 406. Then, when the memory management circuit 502 reads data from the rewritable non-volatile memory module 406, the error correcting code and/or the error detecting code corresponding to the data are read simultaneously. The error checking and correcting circuit 508 may perform an error checking and correcting operation to the read data based on the error correcting code and/or error detecting code.

The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control the power of the memory storage device 10.

In an exemplary embodiment, the rewritable non-volatile memory module 406 of FIG. 4 is also referred to as a flash memory module, the memory control circuit unit 404 of FIG. 4 is also referred to as a flash memory controller configured to control the flash memory module, and/or the memory management circuit 502 of FIG. 5 is also referred to as a flash memory management circuit.

Figure 6:
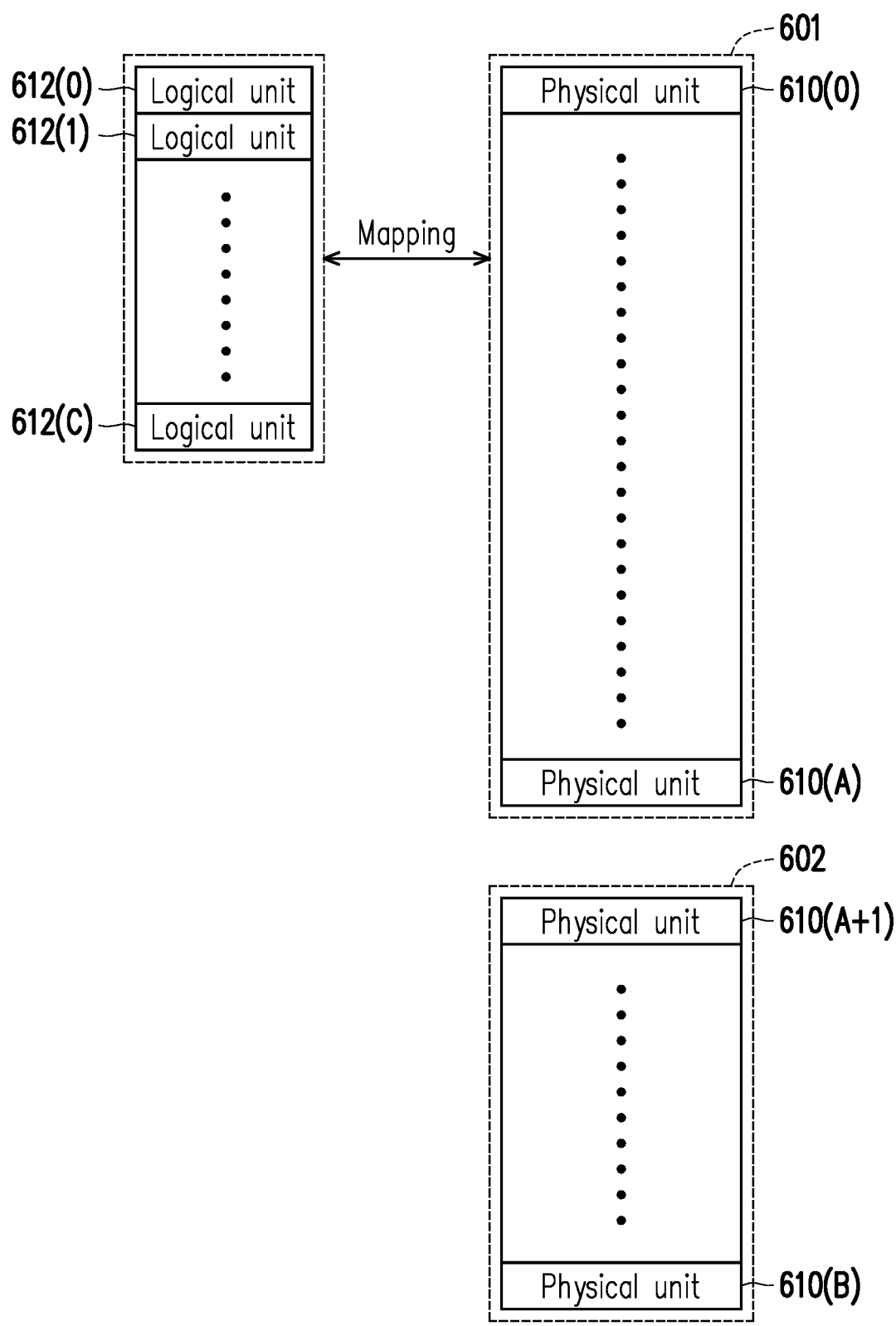
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6, the memory management circuit 502 may logically group the physical units 610(0)-610(B) of the rewritable non-volatile memory module 406 into a storage area 601 and a replacement area 602. The physical units 610(0)-610(A) in the storage area 601 are configured to store data, and the physical units 610(A+1)-610(B) in the replacement area 602 are configured to replace damaged physical units in the storage area 601. For example, if data read from one specific physical unit includes too many errors and these errors cannot be corrected, the specific physical unit is regarded as a damaged physical unit. It is noted that, if there is no available physical erasing unit in the replacement area 602, the memory management circuit 502 may declare the memory storage device 10 as in a write protect state so data may no longer be written thereto.

In the exemplary embodiment, one physical unit is referred to as one physical programming unit. However, in another exemplary embodiment, one physical unit may also refer to one physical address, one physical erasing unit or a composition of a plurality of continuous or discontinuous physical addresses. The memory management circuit 502 may assign logical units 612(0)-612(C) for mapping to the physical units 610(0)-610(A) in the storage area 601. In the exemplary embodiment, one logical unit may refer to one logical address. However, in another exemplary embodiment, one logical unit may also refer to one logical programming unit, one logical erasing unit or a composition of a plurality of continuous or discontinuous logical addresses. In addition, one of the logical units 612(0)-612(C) may be mapped to one or more physical units.

The memory management circuit 502 may record a mapping relation (also referred to as a logical-physical address mapping relation) between the logical units and the physical units into at least one logical-physical address mapping table. When the host system 11 intends to read data from the memory storage device 10 or write data into the memory storage device 10, the memory management circuit 502 may perform a data accessing operation on the memory storage device 10 according to the logical-physical address mapping table.

It is noted that in the following description, some terms may be replaced with corresponding abbreviations for ease of reading (see Table 1).

TABLE 1

| rewritable non-volatile memory module | RNVM module |
|---|---|
| memory management circuit | MMC |
| physical unit | PU |
| physical group | PG |

The MMC 502 may logically group the PUs in the RNVM module 406 into a plurality of groups (also referred to as PGs). One PG may include at least one PU in at least one die, in at least one chip enable (CE), and/or in at least one plane. In addition, one PG may be coupled to one or more channels (also known as memory channels). These channels are used to connect the MMC 502 to the RNVM module 406. The MMC 502 may access specific PGs through at least one of these channels.

Figure 7:
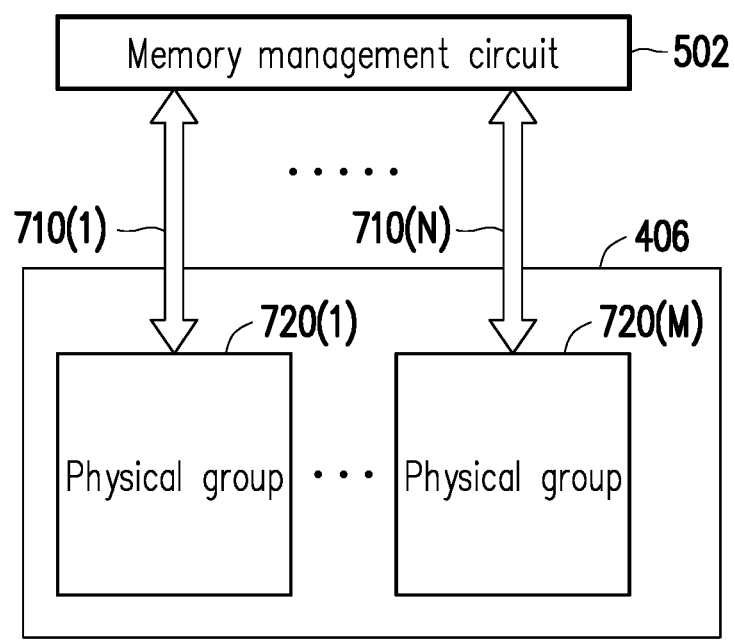
FIG. 7 is a schematic diagram of multiple channels and multiple physical groups according to an exemplary embodiment of the disclosure.

FIG. 7 is a schematic diagram of multiple channels and multiple PGs according to an exemplary embodiment of the disclosure.

Referring to FIG. 7, channels 710(1)-710(N) are connected between the MMC 502 and the PGs 720(1)-720(M) in the RNVM module 406. The channels 710(1)-710(N) are independent of each other. In an exemplary embodiment, the channels 710(1)-710(N) being independent of each other, means that any one of the channels 710(1)-710(N) may be used to transmit data separately. The MMC 502 may communicate with the PGs 720(1)-720(M) via the channels 710(1)-710(N). For example, the MMC 502 may access one or more PUs in the PG 720(1) via the channel 710(1). The MMC 502 may access one or more PUs in the PG 720(M) via the channel 710(N). N and M may both be any integer greater than one. N may be equal to or not equal to M.

In the present exemplary embodiment, the PGs 720(1)-720(M) (or at least two of the PGs 720(1)-720(M)) may be simultaneously or synchronously read by the MMC 502. However, the PGs 720(1)-720(M) cannot be programmed simultaneously or synchronously, and the PGs 720(1)-720(M) cannot be erased simultaneously or synchronously. For example, in an exemplary embodiment, the MMC 502 may send at least one read command sequence to instruct a reading of data from the PGs 720(1)-720(M) synchronously. Alternatively, in an exemplary embodiment, the MMC 502 may send at least one write command sequence (or at least one erase command sequence) to instruct a programming (or an erasing) of at least one of the PG 720(1)-720(M). However, during the programming (or the erasing) of at least one of the PGs 720(1)-720(M), the MMC 502 also retains (or reserves) at least one of the PGs 720(1)-720(M) not being programmed (or erased).

In an exemplary embodiment, at a specific time point (or within a certain time range), the MMC 502 allows (only) a portion of the PGs in the PGs 720(1)-720(M) to be in a default status, and the remaining PGs in the PG 720(1)-720(M) are not in the default status. For example, a PG being in the default status may indicate or reflect that one or more PUs in this PG are currently being programmed or erased. A PG not in the default status may indicate or reflect that no PU in this PG is currently being programmed or erased. In other words, in an exemplary embodiment, if a PU belonging to a specific PG is being programmed or erased at a first time point, the MMC 502 may determine that this PG is in the default status at the first time point. Alternatively, in an exemplary embodiment, if the PUs belonging to a specific PG is not being programmed or erased at the first time point, the MMC 502 may determine that this PG is not in the default status at the first time point.

In an example embodiment, a specific PG being in the default status may not indicate or reflect that data is being read from one or more PUs in this PG. For example, in an exemplary embodiment, if data is read from a PU belonging to a specific PG at the first time point, the MMC 502 may determine that this PG is not in the default status at the first time point.

In an example embodiment, the MMC 502 may determine whether a PG is in the default status. If this PG is in the default status, the MMC 502 may instruct an execution of an operation on another PG, and this operation does not trigger said another PG to the default status. For example, operations that do not trigger a specific PG to the default status may include an operation of reading data and/or not include a programming operation and an erasing operation. It is assumed that, at a specific time point, the MMC 502 determines that the PG 720(1) is in the default status (e.g., at least one PU in the PG 720(1) is being programmed or erased). In response to the PG 720(1) being in the default status, the MMC 502 may allow operations that do not trigger the PG 720(M) to the default status to be performed on the PG 720(M) (e.g., reading data from at least one PU of the PG 720(M)).

In an exemplary embodiment, in response to the PG 720(1) being in the default status, the MMC 502 may not allow at least one PU of the PG 720(M) to be programmed or erased (or the MMC 502 may prohibit operations which may trigger the PG 720(M) to the default status) during a period that the PG 720(1) is in the default status. After the PG 720(1) leaves the default status, the MMC 502 may allow the programming, the erasing or other operations which may trigger the PG 720(M) to the default status to be performed on at least one PU in the PG 720(M).

In an example embodiment, the MMC 502 may adjust a command execution queue. The command execution queue may be used to temporarily store at least one command sequence that indicates an access of the RNVM module 406. The MMC 502 may adjust the command execution queue, so as to stop, pause, or delay an execution of an operation which may trigger a specific PG to the default status. For example, in response to that the PG 720(1) is in the default status, the MMC 502 may decrease a priority of at least one command sequence which indicates an execution of an operation, on at least one PU of the physical group 720(M), which may trigger the PG 720(M) to the default status, in the command execution queue and/or increase a priority of at least one command sequence which indicates an execution of an operation, on at least one PU of the physical group 720(M), which may not trigger the PG 720(M) to the default status, in the command execution queue. Thereby, according to the adjusted command execution queue, during the period when the PG 720(1) is in the default status, the MMC 502 may preferentially perform an operation not triggering the PG 720(M) to the default status on the PG 720(M), and/or delay an operation which may trigger the PG 720(M) to the default status on the PG 720(M).

In an example embodiment, the MMC 502 may store at least one management table (also referred to as table information) in at least two PGs among the PGs 720(1)-720(M), respectively. These management tables respectively record management information corresponding to a specific logical range (also known as first logical range). For example, the management tables may include a logical-physical mapping table, and the management information recorded in the management tables may include logical-physical mapping information (i.e., a logical-physical mapping relationship) related to at least one logical unit within the first logical range. Taking FIG. 6 as an example, a logical-physical mapping relationship (also referred to as a mapping relationship) between the logical unit 612(0) and the PU 610(0) may be recorded in a logical-physical mapping table. When receiving a read command from the host system 11 of FIG. 1 and the read command instructs to read data belonging to the logical unit 612(0), the MMC 502 may read the required data from the PU 610(0) according to this mapping relationship. The logical unit 612(0) belongs to the first logical range.

In an exemplary embodiment, the plurality of management tables recorded in different PGs may be backed up (or copies) for each other. For multiple management tables that are backed up (or copies) for each other, even if the management information recorded in a specific management table which is stored in a specific PG is first updated at a specific time point, the management information recorded in another management table which is stored in another PG may also be updated correspondingly at another time point, such that the contents of these management tables stored in different PGs may be maintained to be consistent. For example, in two management tables recording consistent contents and being backed up (or copies) for each other, the recorded logical-physical mapping information may be the same. It is noted that, in another exemplary embodiment, the above-mentioned management tables which are backed up for each other may further include a bad block management table or other types of management tables, which are not limited by the present disclosure.

In an exemplary embodiment, at a specific time point, in response to a specific PG among the PGs 720(1)-720(M) being in the default status, the MMC 502 may send a read command sequence to instruct a reading of at least one management table from the remaining PGs among the PGs 720(1)-720(M), so as to obtain the required management information. For example, the MMC 502 may read the management table from one or more PGs among the PGs 720(1)-720(M) that are not in the default status. This ensures that at least one channel may be used to instantly read the management table from a specific PG at any time point, and thereby reducing the occurrence of the load table latency.

Figure 8A:
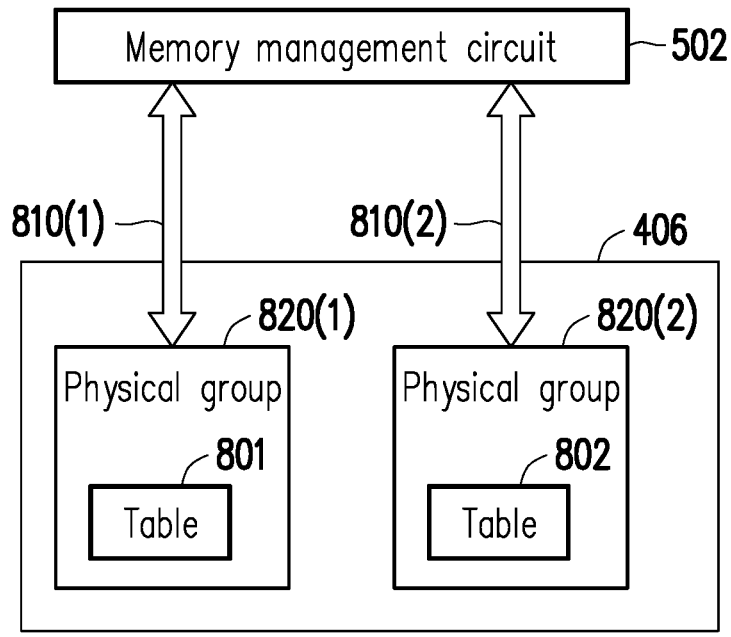
FIG. 8A to FIG. 8C are schematic diagrams of table information reading operations according to an exemplary embodiment of the disclosure.
Figure 8B:
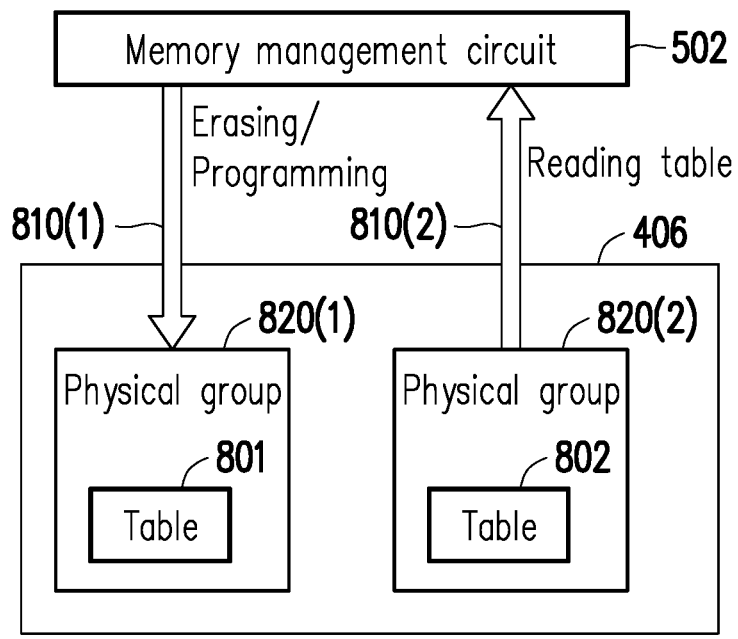
Figure 8C:
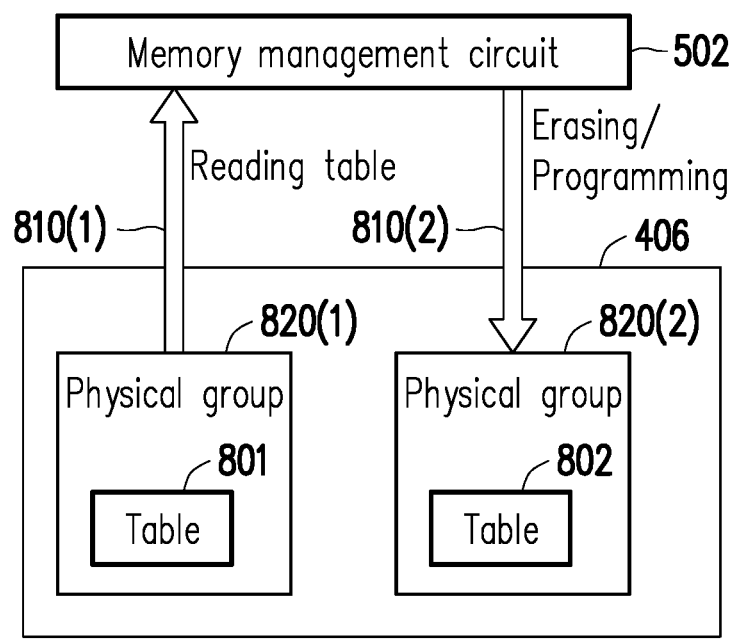

FIG. 8A to FIG. 8C are schematic diagrams of table information reading operations according to an exemplary embodiment of the disclosure.

Referring to FIG. 8A, in the present exemplary embodiment, it is assumed that PGs 820(1) and 820(2) are grouped in the RNVM module 406. The PGs 820(1) and 820(2) respectively contain one or more PUs. The MMC 502 may access the PUs in the PG 820(1) via the channel 810(1) and access the PUs in the PG 820(2) via the channel 810(2). The MMC 502 may store management tables (i.e., the table information) 801 and 802 into the PGs 820(1) and 820(2), respectively. For example, the management table 801 may be stored in a system block (or system area) in the PG 820(1) and/or the management table 802 may be stored in a system block (or system area) in the PG 820(2). In addition, the management tables 801 and 802 may be backed up (or copies) for each other. For example, the management tables 801 and 802 may both be used to record management information (e.g., mapping information) corresponding to the same logical range (e.g., the first logical range).

It is noted that, in the exemplary embodiments of FIG. 8A to FIG. 8C, the MMC 502 may allow data to be read from the PGs 820(1) and 820(2) via the channels 810(1) and 810(2) synchronously (or in parallel). For example, at a specific time point, the PUs in the PGs 820(1) and 820(2) may be read synchronously (or in parallel) via the channels 810(1) and 810(2). However, the MMC 502 does not allow (or prohibit) programming or erasing of PUs in the PGs 820(1) and 820(2) via the channels 810(1) and 810(2) synchronously. For example, at a specific time point, if a PU in the PG 820(1) is programmed or erased via the channel 810(1), then at this time point, the PUs in the PG 820(2) cannot be programmed or erased. Alternatively, at a specific time point, if a PU in the PG 820(2) is programmed or erased via the channel 810(2), then at this time point, the PUs in the PG 820(1) cannot be programmed or erased.

Referring to FIG. 8B, at a specific time point, it is assumed that the PG 820(1) is in the default status (e.g., at least one PU in the PG 820(1) is being programmed or erased via the channel 810(1)). At this time point, in response to that the PG 820(1) is in the default status, the MMC 502 may instruct a reading of the management table 802 from the PG 820(2) via the channel 810(2), so as to obtain the management information recorded in the management table 802. In an exemplary embodiment of FIG. 8B, if a management table (e.g., the management table 801) is to be read from a PG (e.g., the PG 820(1)) which is in the default status, the MMC 502 may need to wait for the finish of the executed programming or erasing, which may cause the load table latency. However, by reading the management table (e.g., the management table 802) directly from a PG (e.g., the PG 820(2)) that is controlled as not in the default status, the required management information may be quickly obtained to avoid the occurrence of the load table latency.

Referring to FIG. 8C, at another time point, it is assumed that the PG 820(2) is in the default status (e.g., at least one PU in the PG 820(2) is being programmed or erased via the channel 810(2)). At this time point, in response to that the PG 820(2) is in the default status, the MMC 502 may instruct a reading of the management table 801 from the PG 820(1) via the channel 810(1), so as to obtain the management information recorded in the management table 801. In this way, load table latency may also be avoided.

Figure 9A:
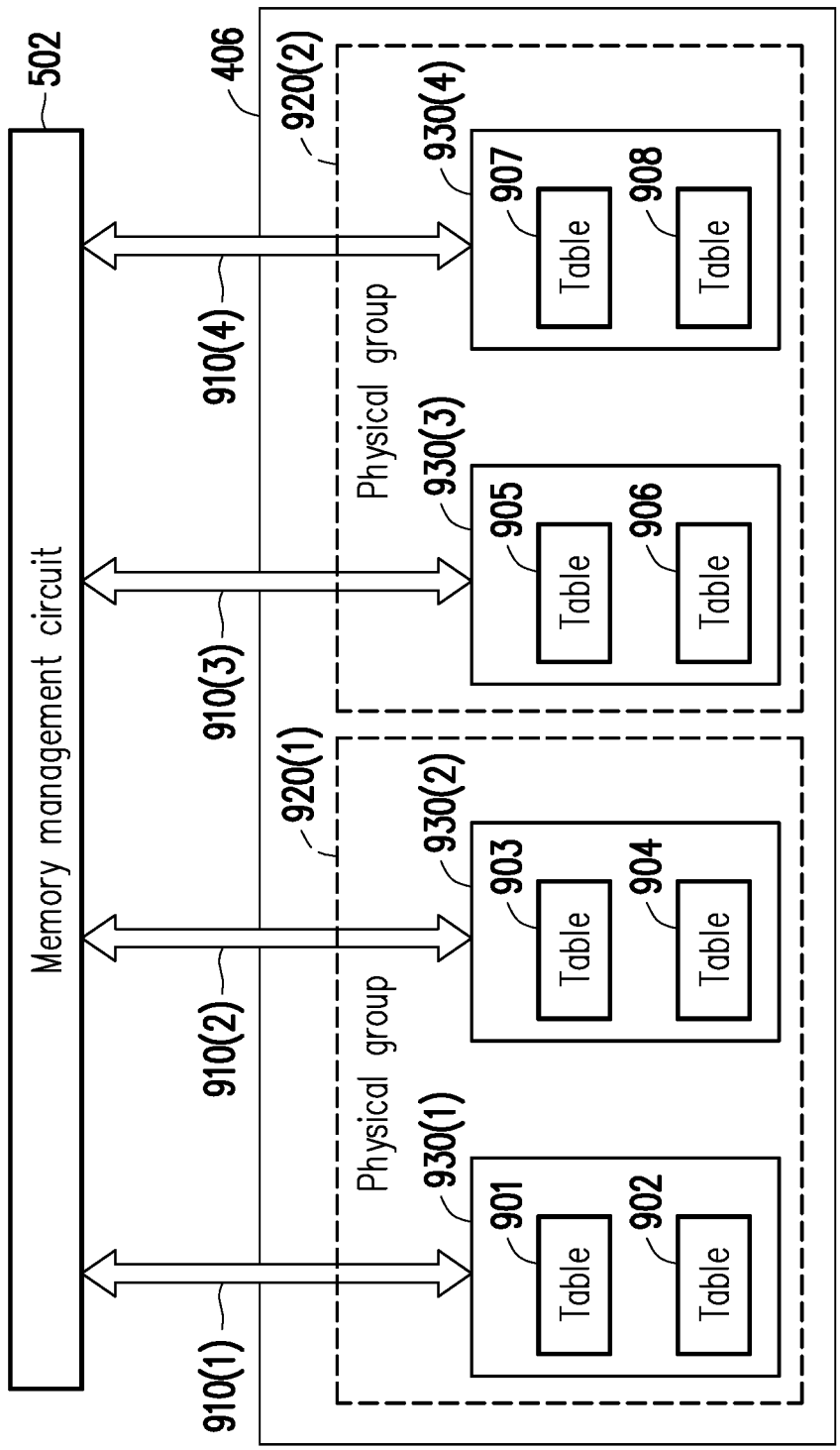
FIG. 9A to FIG. 9C are schematic diagrams of table information reading operations according to an exemplary embodiment of the disclosure.
Figure 9B:
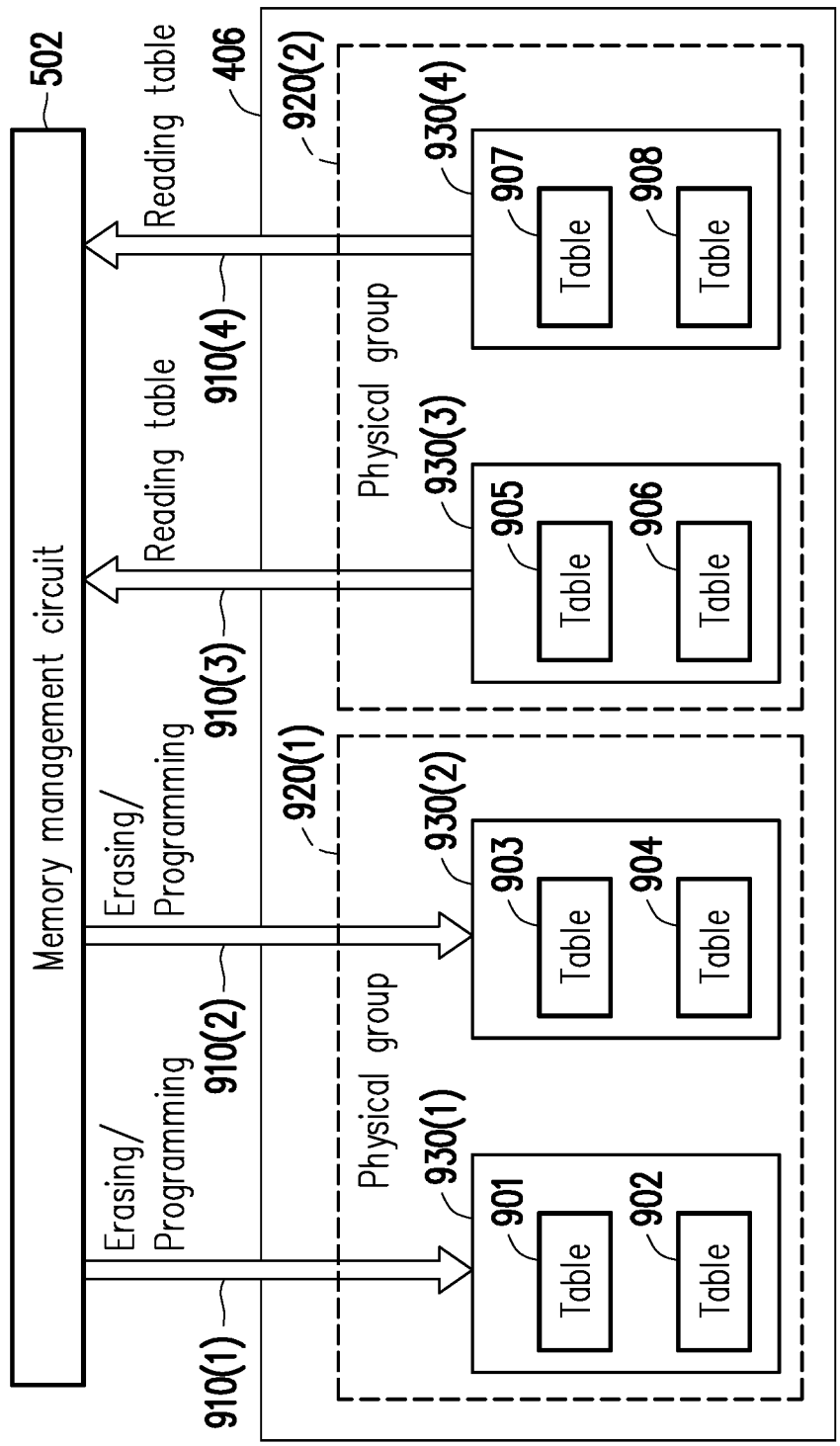
Figure 9C:
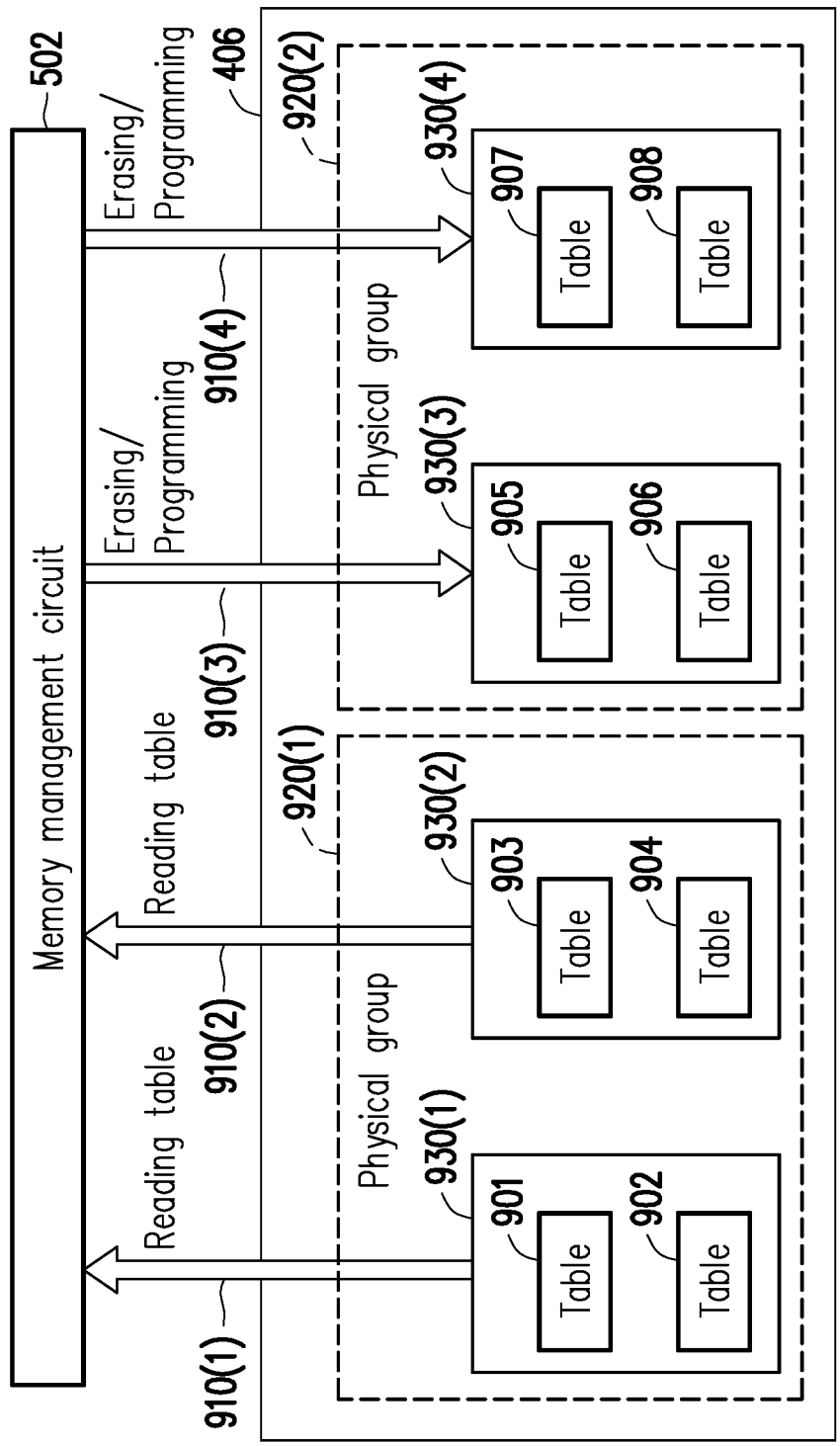

FIG. 9A to FIG. 9C are schematic diagrams of table information reading operations according to an exemplary embodiment of the disclosure.

Referring to FIG. 9A, in the present exemplary embodiment, it is assumed that PGs 920(1) and 920(2) are grouped in the RNVM module 406. The PGs 920(1) and 920(2) respectively contain one or more PUs. The MMC 502 may access the PUs in the PG 920(1) via the channels 910(1) and 910(2) and access the PUs in the PG 920(2) via the channels 910(3) and 910(4).

It is noted that, in the present exemplary embodiment, the PG 920(1) includes at least one PU belonging to a system area 930(1) and at least one PU belonging to a system area 930(2). The PG 920(2) includes at least one PU belonging to a system area 930(3) and at least one PU belonging to a system area 930(4). The MMC 502 may store management tables (i.e., the table information) 901 and 902 into at least one PU in the system area 930(1). The MMC 502 may store management tables 903 and 904 into at least one PU in the system area 930(2). The MMC 502 may store management tables 905 and 906 into at least one PU in the system area 930(3). Additionally, MMC 502 may store management tables 907 and 908 into at least one PU in system area 930(4).

In the present exemplary embodiment, the management tables 901 and 905 are backed up (or copies) for each other, the management tables 902 and 906 are backed up (or copies) for each other, the management tables 903 and 907 are backed up (or copies) for each other, and the management tables 904 and 908 are backed up (or copies) for each other. For example, the management tables 901 and 905 may both be used to record management information (e.g., mapping information) corresponding to the same logical range (e.g., the first logical range). The management tables 902 and 906 may both be used to record management information corresponding to the same logical range (e.g., a second logical range). The management tables 903 and 907 may both be used to record management information corresponding to the same logical range (e.g., a third logical range). The management tables 904 and 908 may both be used to record management information corresponding to the same logical range (e.g., a fourth logical range). The first logical range, the second logical range, the third logical range, and the fourth logical range may cover different logical ranges.

It is noted that, in the example embodiments of FIG. 9A to FIG. 9C, the MMC 502 may allow data to be read from the PGs 920(1) and 920(2) via at least two channels among the channels 910(1)-910(4) synchronously (or in parallel). However, the MMC 502 does not allow (or prohibit) programming or erasing of PUs in the PGs 920(1) and 920(2) via the channels 910(1)-910(4) synchronously. For example, at a specific time point, if PUs in the PG 920(1) are synchronously programmed or erased via the channels 910(1) and 910(2), then at this time point, the PUs in the PG 920(2) cannot be programmed or erased. Alternatively, at a specific time point, if PUs in the PG 920(2) are synchronously programmed or erased via the channels 910(3) and 910(4), then at this time point, the PUs in the PG 920(1) cannot be programmed or erased.

Referring to FIG. 9B, at a specific time point, it is assumed that the PG 920(1) is in the default status (e.g., at least one PU in the PG 920(1) is currently programmed or erased via the channels 910(1) and/or 910(2)). At this time point, in response to that the PG 920(1) is in the default status, the MMC 502 may instruct a reading of at least one of the management tables 905-908 from the PG 920(2) via the channels 910(3) and/or 910(4) to obtain the required management information.

Referring to FIG. 9C, at another time point, it is assumed that the PG 920(2) is in the default status (e.g., at least one PU in the PG 920(2) is currently programmed or erased via the channels 910(3) and/or 910(4)). At this time point, in response to that the PG 920(2) is in the default status, the MMC 502 may instruct a reading of at least one of the management tables 901-904 from the PG 920(1) via the channels 910(1) and/or 910(2) to obtain the required management information.

In an exemplary embodiment, after receiving an command from the host system 11 of FIG. 1 and the command indicates an access of data belonging to a specific logical unit, the MMC 502 may determine whether a specific PG among multiple PGs that store management information for accessing this logical unit is in (or not in) the default status. According to the determination result, the MMC 502 may read the management information (e.g., the mapping information) for accessing this logical unit from a PG which is not in the default status, thereby preventing the load table latency. After obtaining the required management information, the MMC 502 may read data from a PU mapped by this logical unit according to the management information and then transmit the read data to the host system 11.

In an exemplary embodiment, it is assumed that one specific PG (also referred to as a first PG) stores specific table information (also referred to as first table information), and another PG (also referred to as a second PG) stores another table information (also known as second table information). The first table information and the second table information are backed up (or copies) for each other. After reading the second table information from the second PG, the second table information may be stored to the buffer memory 510 of FIG. 5. The MMC 502 may query the second table information in the buffer memory 510 and perform related data access operations accordingly. Details of the relevant operations are detailed above and will not be described here.

In an exemplary embodiment, the MMC 502 may update the second table information in the buffer memory 510 according to the performed data access operations. For example, management information (e.g., mapping information) related to a specific logical unit in the second table information may be changed. After the first PG is not in the default status (e.g., programming or erasing of a PU of the first PG is finished), the MMC 502 may instruct a reading of the first table information from the first PG. Then, the MMC 502 may update the first table information in the buffer memory 510 according to the update of the second table information, to make the management information recorded in the first table information being consistent with the management information recorded in the second table information.

In an exemplary embodiment, the MMC 502 may reserve a space (also referred to as a table space) in the buffer memory 510 before updating the management information recorded in the first table information and the management information recorded in the second table information to be consistent with each other. The table space may be configured to store the first table information and/or the second table information. In other words, reserving of the table space may avoid the storage space of the buffer memory 510 from being exhausted before the first table information is updated.

In an exemplary embodiment, the MMC 502 may store the first table information not yet updated and the updated second table information in the table space at the same time. Then, the MMC 502 may update the first table information based on the updated second table information. Alternatively, in an exemplary embodiment, the MMC 502 may store update information of the second table information into the buffer memory 510. The update information may reflect the update content of the second table information. After loading the first table information into the table space in the buffer memory 510, the MMC 502 may update the first table information based on the update information. The MMC 502 may release the reserved space after updating the management information recorded in the first table information and the management information recorded in the second table information to be consistent with each other. In addition, the updated first table information and the updated second table information may be stored back to the first PG and the second PG, respectively.

It is noted that, although the exemplary embodiments of FIG. 8A to FIG. 8C and the exemplary embodiments of FIG. 9A to FIG. 9C are exemplified by two PGs, the present disclosure does not limit the number of PGs that may be grouped. In another exemplary embodiment, the number of PGs storing management tables that are backed up (or copies) for each other may also be three, four or more, which is not limited by the present disclosure. In addition, the number of channels, the coupling relationship of these channels, the number of management tables, and/or the storage location of the management tables in the exemplary embodiments of FIG. 8A to FIG. 8C and the exemplary embodiments of FIG. 9A to FIG. 9C are merely examples, and it is not intended to limit the disclosure.

Figure 10:
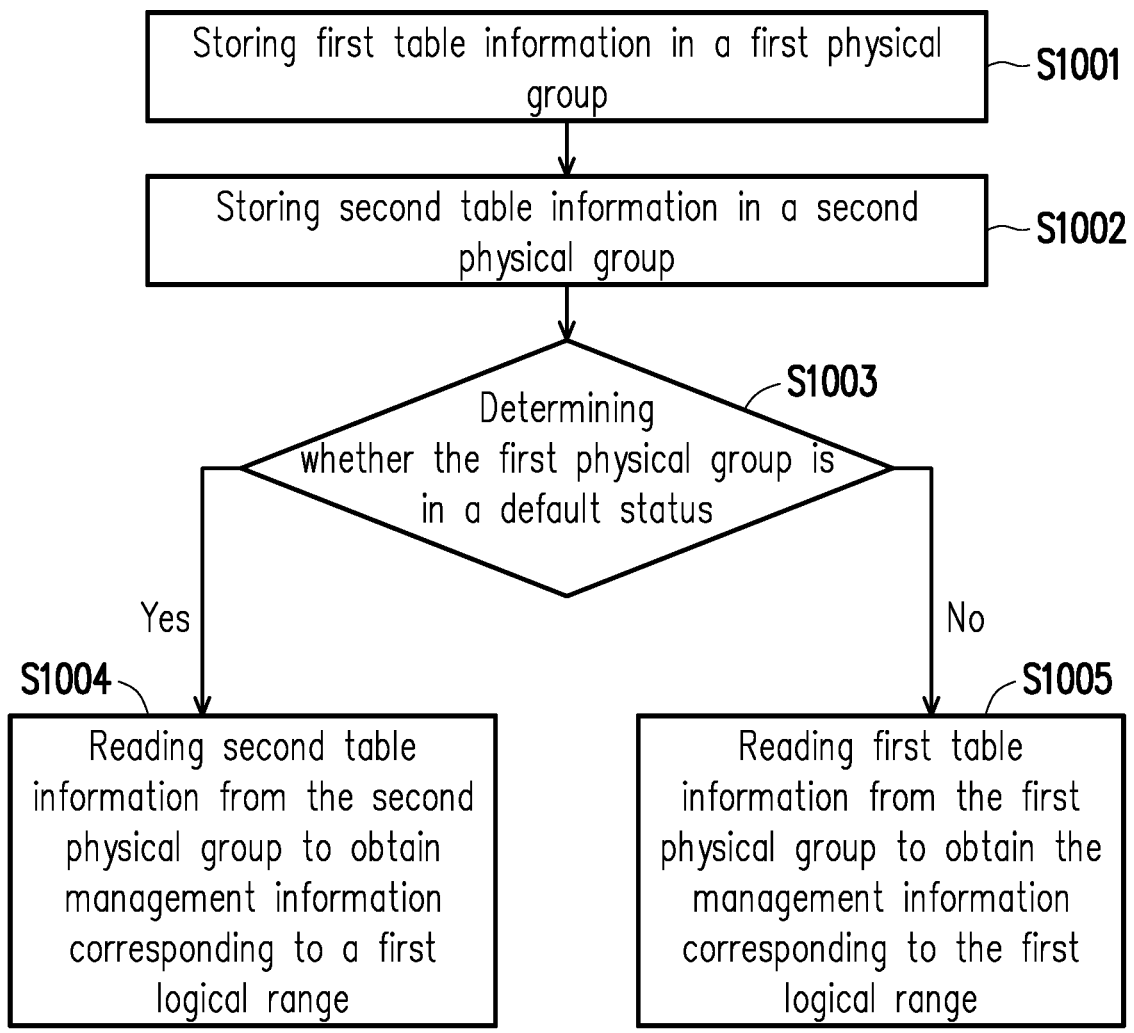
FIG. 10 is a flowchart of a memory control method according to an exemplary embodiment of the disclosure.

FIG. 10 is a flowchart of a memory control method according to an exemplary embodiment of the disclosure.

Referring to FIG. 10, in step S1001, first table information is stored into a first PG among a plurality of PGs. The first table information records management information corresponding to a first logical range. In step S1002, second table information is stored into a second PG among these PGs. The second table information also records the management information corresponding to the first logical range. In step S1003, it is determined whether the first PG is in a default status. In response to that the first PG is in the default status, in step S1004, the second table information is read from the second PG to obtain the management information corresponding to the first logical range. In addition, in response to that the first PG is not in the default status, in step S1005, the first table information may be read from the first PG to obtain the management information corresponding to the first logical range.

It is noted that, the present disclosure does not limit the order of executions of the steps S1001 and S1002. For example, in another exemplary embodiment, the step S1002 may be performed first and then the step S1001 may be performed or the steps S1001 and S1002 may be performed synchronously. In addition, in another exemplary embodiment, the step S1005 may also be modified to read second table information from the second PG to obtain the management information corresponding to the first logical range, which is not limited by the present disclosure.

However, the steps in FIG. 10 have been described in detail above and may not be reiterated here. It shall be noted that the steps in FIG. 10 may be implemented as multiple program codes or circuits, and the disclosure is not limited thereto. In addition, the methods of FIG. 10 may be used in combination with the embodiments above or may be used alone, and the disclosure is not limited thereto.

Based on the above, at least two copies of table information corresponding to the same logical range are stored to a first PG and a second PG in the RNVM module according to the exemplary embodiments of the disclosure. Thereafter, in response to that a specific PG (e.g., the first PG) is in the default status, the table information may be read from another PG (e.g., the second PG) to obtain the required management information. Therefore, an occurring opportunity of the load table latency may be reduced and the operation stability of the memory storage device may be improved.

The previously described exemplary embodiments of the present disclosure have the advantages aforementioned, wherein the advantages aforementioned not required in all versions of the disclosure.

It may be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory control method, for a rewritable non-volatile memory module, wherein the rewritable non-volatile memory module comprises a plurality of physical groups, and the memory control method comprises:

storing first table information into a first physical group among the physical groups, wherein the first table information records management information corresponding to a first logical range;

storing second table information into a second physical group among the physical groups, wherein the second table information also records the management information corresponding to the first logical range;

instructing a reading of the second table information from the second physical group to obtain the management information corresponding to the first logical range in response to that the first physical group is in a default status; and prohibiting an operation which can trigger the second physical group to the default status during a period that the first physical group is in the default status, wherein the first physical group is accessed through a first memory channel, the second physical group is accessed through a second memory channel, and the first memory channel is independent from the second memory channel.

2. The memory control method according to claim 1, further comprises:

storing the second table information read from the second physical group into a buffer memory;

instructing a reading of the first table information from the first physical unit after the first physical unit is not in the default status; and updating the first table information and the second table information in the buffer memory to make the management information recorded in both of the first table information and the second table information being consistent.

3. The memory control method according to claim 2, further comprises:

reserving a table space in the buffer memory to store at least one of the first table information and the second table information; and releasing the table space after the first table information and the second table information is updated.

4. The memory control method according to claim 1, further comprises:

instructing a reading of the first table information from the first physical group to obtain the management information corresponding to the first logical range in response to that the second physical group is in the default status.

5. The memory control method according to claim 1, wherein the first physical group being in the default status comprises at least one of a status that a programming operation corresponding to the first physical group is not yet completed and a status that an erasing operation corresponding to the first physical group is not yet completed.

6. The memory control method according to claim 1, wherein at least one physical unit in the first physical group and at least one physical unit in the second physical group can be read synchronously.

7. The memory control method according to claim 1, wherein any physical unit in the first physical group and any physical unit in the second physical group cannot be programmed or erased synchronously.

8. The memory control method according to claim 1, further comprises:

determining whether the first physical group is in the default status; and performing an operation not triggering the second physical group to the default status on the second physical group in response to that the first physical group is in the default status.

9. The memory control method according to claim 8, further comprises:

adjusting a command execution queue; and performing, by the adjusted command execution queue, the operation not triggering the second physical group to the default status on the second physical group.

10. A memory storage device, comprising:

a connection interface unit, configured to connect a host system, a rewritable non-volatile memory module which comprises a plurality of physical groups; and a memory control circuit unit, coupled to the connection interface unit and the rewritable non-volatile memory module, wherein the memory control circuit unit is configured to store first table information into a first physical group among the physical groups, wherein the first table information records management information corresponding to a first logical range, the memory control circuit unit is further configured to store second table information into a second physical group among the physical groups, wherein the second table information also records the management information corresponding to the first logical range, the memory control circuit unit is further configured to instruct a reading of the second table information from the second physical group to obtain the management information corresponding to the first logical range in response to that the first physical group is in a default status, and the memory control circuit unit is further configured to prohibit an operation which can trigger the second physical group to the default status during a period that the first physical group is in the default status, wherein the first physical group is accessed through a first memory channel, the second physical group is accessed through a second memory channel, and the first memory channel is independent from the second memory channel.

11. The memory storage device according to claim 10, wherein the memory control circuit unit is further configured to store the second table information read from the second physical group into a buffer memory, the memory control circuit unit is further configured to instruct a reading of the first table information from the first physical unit after the first physical unit is not in the default status, and the memory control circuit unit is further configured to update the first table information and the second table information in the buffer memory to make the management information recorded in both of the first table information and the second table information being consistent.

12. The memory storage device according to claim 11, wherein the memory control circuit unit is further configured to reserve a table space in the buffer memory to store at least one of the first table information and the second table information, and the memory control circuit unit is further configured to release the table space after the first table information and the second table information is updated.

13. The memory storage device according to claim 10, wherein the memory control circuit unit is further configured to instruct a reading of the first table information from the first physical group to obtain the management information corresponding to the first logical range in response to that the second physical group is in the default status.

14. The memory storage device according to claim 10, wherein the first physical group being in the default status comprises at least one of a status that a programming operation corresponding to the first physical group is not yet completed and a status that an erasing operation corresponding to the first physical group is not yet completed.

15. The memory storage device according to claim 10, wherein at least one physical unit in the first physical group and at least one physical unit in the second physical group can be read synchronously.

16. The memory storage device according to claim 10, wherein any physical unit in the first physical group and any physical unit in the second physical group cannot be programmed or erased synchronously.

17. The memory storage device according to claim 10, wherein the memory control circuit unit is further configured to determine whether the first physical group is in the default status, and the memory control circuit unit is further configured to perform an operation not triggering the second physical group to the default status on the second physical group in response to that the first physical group is in the default status.

18. The memory storage device according to claim 17, wherein the memory control circuit unit is further configured to adjust a command execution queue, and the adjusted command execution queue is configured to perform the operation not triggering the second physical group to the default status on the second physical group.

19. A memory control circuit unit for controlling a rewritable non-volatile memory module comprising a plurality of physical groups, and the memory control circuit unit comprising:

a host interface configured to couple to a host system;

a memory interface, configured to couple to the rewritable non-volatile memory module; and a memory management circuit, coupled to the host interface and the memory interface, wherein the memory management circuit is configured to store first table information into a first physical group among the physical groups, wherein the first table information records management information corresponding to a first logical range, the memory management circuit is further configured to store second table information into a second physical group among the physical groups, wherein the second table information also records the management information corresponding to the first logical range, the memory management circuit is further configured to instruct a reading of the second table information from the second physical group to obtain the management information corresponding to the first logical range in response to that the first physical group is in a default status, and the memory management circuit is further configured to prohibit an operation which can trigger the second physical group to the default status during a period that the first physical group is in the default status, wherein the first physical group is accessed through a first memory channel, the second physical group is accessed through a second memory channel, and the first memory channel is independent from the second memory channel.

20. The memory control circuit unit according to claim 19, further comprising a buffer memory coupled to the memory management circuit, wherein the memory management circuit is further configured to store the second table information read from the second physical group into the buffer memory, the memory management circuit is further configured to instruct a reading of the first table information from the first physical unit after the first physical unit is not in the default status, and the memory management circuit is further configured to update the first table information and the second table information in the buffer memory to make the management information recorded in both of the first table information and the second table information being consistent.

21. The memory control circuit unit according to claim 20, wherein the memory management circuit is further configured to reserve a table space in the buffer memory to store at least one of the first table information and the second table information, and the memory management circuits further configured to release the table space after the first table information and the second table information is updated.

22. The memory control circuit unit according to claim 19, wherein the memory management circuit is further configured to instruct a reading of the first table information from the first physical group to obtain the management information corresponding to the first logical range in response to that the second physical group is in the default status.

23. The memory control circuit unit according to claim 19, wherein the first physical group being in the default status comprises at least one of a status that a programming operation corresponding to the first physical group is not yet completed and a status that an erasing operation corresponding to the first physical group is not yet completed.

24. The memory control circuit unit according to claim 19, wherein at least one physical unit in the first physical group and at least one physical unit in the second physical group can be read synchronously.

25. The memory control circuit unit according to claim 19, wherein any physical unit in the first physical group and any physical unit in the second physical group cannot be programmed or erased synchronously.

26. The memory control circuit unit according to claim 19, wherein the memory management circuit is further configured to determine whether the first physical group is in the default status, and the memory management circuit is further configured to perform an operation not triggering the second physical group to the default status on the second physical group in response to that the first physical group is in the default status.

27. The memory control circuit unit according to claim 26, wherein the memory management circuit is further configured to adjust a command execution queue, and the adjusted command execution queue is configured to perform the operation not triggering the second physical group to the default status on the second physical group.

* * * * *